Patented Dec. 6, 1949

2,490,671

UNITED STATES PATENT OFFICE 2,490,671

SEPARATION OF METAETHYLPHENOL FROM PARAETHYLPHENOL

Francis E. Cislak and Merritt M. Otto, Indianapolis, Ind., assignors to Reilly Tar & Chemical Corporation, Indianapolis, Ind., a corporation of Indiana No Drawing. Application September 25, 1946, Serial No. 699,340

12 Claims. (Cl. 260—624)

Our invention relates to the separation of metaethylphenol from mixtures containing metaethylphenol and paraethylphenol and to the new compound metaethylphenol-orthotoluidine.

It is the object of our present invention to obtain an individual metaethylphenol; and to obtain the new compound metaethylphenol-orthotoluidine.

A mixture of metaethylphenol and paraethylphenol associated with various other phenolic bodies, is obtained in the processing of coal tar and of petroleum. The other phenolic bodies commonly present, including 1,2,3-xylenol (1,2-dimethyl -3- hydroxybenzene) and 1,3,5-xylenol (1,3-dimethyl-5-hydroxybenzene) can be separated quite readily and fairly completely from mixtures of metaethylphenol and paraethylphenol by fractional distillation. The boiling points of the metaethylphenol (218.8° C.) and paraethylphenol (218.4° C.) are so close together that it is not commercially practical to separate them by fractional distillation.

We have found that by treating with orthotoluidine a mixture of metaethylphenol and paraethylphenol containing more than 30% metaethylphenol, whether or not the mixture also contains small amounts of higher or lower related phenolic bodies (such as 1,2,3-xylenol and 1,3,5-xylenol), and cooling either before and/or after and/or during the mixing, we get a formation of crystals of an addition product of some character composed of one molecule of metaethylphenol and one molecule of orthotoluidine. The cooling is desirably to a temperature as low as about −15° C. but rarely needs to be below −20° C. The crystals can readily be recovered, as by decanting or filtering, and can readily be reconverted into substantially pure metaethylphenol and substantially pure orthotoluidine.

Upon the recovery of the crystals of metaethylphenol-orthotoluidine by the decanting or filtering above referred to, the mother liquor remaining is much enriched in paraethylphenol, in comparison with the original metaethylphenol and paraethylphenol mixture, and also contains considerable orthotoluidine and some metaethylphenol. This mother liquor may be used as a source of paraethylphenol, as by the process described in our copending application, Serial No. 684,768 filed July 19, 1946.

The metaethylphenol-orthotoluidine is a new compound. Its crystal point is approximately 26° C. This new compound is useful in fungicidal preparations as well as in the present process of separating metaethylphenol from paraethylphenol.

The following examples illustrate our invention:

Example 1.—Thirteen hundred and fifty-eight pounds of a mixture of metaethylphenol and paraethylphenol, containing about 55% metaethylphenol, is thoroughly mixed with about 1191 pounds of orthotoluidine and about 290 pounds of petroleum naphtha. The mixing can be done with the ingredients cold, or preferably the mixture may be cooled after the mixing, in either case to obtain a temperature of about −15° C. By such cooling the addition product metaethylphenol-orthotoluidine usually crystallizes spontaneously from the mixture, although sometimes it is necessary to start crystallization by seeding with crystals of metaethylphenol-orthotoluidine. The crystals of metaethylphenol-orthotoluidine produced by the cooling are suitably separated, most conveniently by filtration. Although it is not necessary to do so, we prefer to wash these crystals with a cooled inert solvelt—such as a paraffinic petroleum naphtha—to remove any mother liquor adhering to the crystals. These washed crystals of metaethylphenol-orthotoluidine are subjected to fractional distillation, which decomposes them into metaethylphenol and orthotoluidine whereupon the orthotoluidine distills over first and then the metaethylphenol distills over. As so recovered the metaethylphenol usually is of about 90 to 95% purity.

Example 2.—One hundred twenty-one pounds of a mixture of metaethylphenol and paraethylphenol, containing about 75% metaethylphenol, is thoroughly mixed with about 115 pounds of orthotoluidine. The mixing can be done with the ingredients cold, or preferably the mixture may be cooled after the mixing, in either case to obtain a temperature of about 4° C. By such cooling the addition product metaethylphenol-orthotoluidine usually crystallizes sponstaneously from the mixture, although sometimes it is necessary to start crystallization by seeding with crystals of metaethylphenol-orthotoluidine. The crystals of metaethylphenol-orthotoluidine produced by the cooling are suitably separated, most conveniently by filtration. Although it is not necessary to do so, we prefer to wash these crystals with a cooled inert solvent—such as a paraffinic petroleum naphtha—to remove any mother liquor adhering to the crystals. These washed crystals of metaethylphenol-orthotoluidine are then decomposed into metaethylphenol and orthotoluidine in any convenient manner. The obtaining of the metaethylphenol by fractional distillation from the metaethylphenol-orthotoluidine as described in Example 1, is our preferred way of obtaining it; but we can obtain it from the metaethylphenol-orthotoluidine in other ways. Thus, we can treat the metaethylphenol-orthotoluidine with a large excess of an aqueous caustic soda solution of between 10% and 30% concentration. This decomposes the metaethylphenol-orthotoluidine to yield orthotoluidine and metaethylphenol dissolved in aqueous caustic soda. The orthotoluidine is removed from this caustic soda solution, as by steam distillation. After all of the orthotoluidine has been removed the caustic soda solution is neutralized with sulfuric acid. This neutralization yields an upper layer of metaethylphenol and a lower layer of sodium sulfate dissolved in water. The metaethylphenol is separated from the aqueous solution of sodium sulfate by decantation.

As so recovered the metaethylphenol usually is of about 90 to 95% purity.

*Example 3.*—One hundred ninety-seven pounds of a mixture of metaethylphenol and paraethylphenol, containing 40% to 44% metaethylphenol, is thoroughly mixed with 172 pounds of orthotoluidine and about 50 pounds of petroleum naphtha. The mixing can be done with the ingredients cold, or preferably the mixture may be cooled after the mixing, in either case to obtain a temperature of about −20° C. By such cooling the addition product metaethylphenol-orthotoluidine usually crystallizes spontaneously from the mixture, although sometimes it is necessary to start crystallization by seeding with crystals of metaethylphenol-orthotoluidine. The crystals of metaethylphenol-orthotoluidine produced by the cooling are suitably separated, as for example by centrifugation. These crystals are then washed with a cooled inert solvent—such as a paraffinic petroleum naphtha—to remove any mother liquor adhering to them. The metaethylphenol may be recovered from the crystals of metaethylphenol-orthotoluidine in any suitable manner. The metaethylphenol usually is of about 90 to 95% purity.

In the above examples we have used a molecular excess of orthotoluidine; this we deem desirable although not essential. In some of the above examples we have used petroleum naphtha as a diluent; we need not use any diluent or we may use some other inert diluent.

We claim:

1. The process of separating metaethylphenol from a mixture consisting mainly of metaethylphenol and paraethylphenol with the metaethylphenol content being more than 30%, which comprises mixing such a mixture with orthotoluidine, producing in the resultant mixture a sufficiently low temperature to form crystals of metaethylphenol-orthotoluidine, separating such crystals, and recovering metaethylphenol in purified form from the crystals.

2. The process of separating metaethlyphenol from a mixture consisting mainly of metaethylphenol and paraethylphenol, with the metaethylphenol being more than 30%, which comprises mixing such a mixture with a molecular excess of orthotoluidine, crystallizing metaethylphenol-orthotoluidine from the resulting mixture, separating the crystals so produced, and recovering metaethylphenol in purified form from the crystals.

3. The process of separating metaethylphenol from a mixture consisting mainly of metaethylphenol and paraethylphenol with the metaethylphenol content being more than 30%, which comprises mixing such a mixture with orthotoluidine, producing in the resulting mixture a sufficiently low temperature to form crystals of metaethylphenol-orthotoluidine, separating such crystals, and recovering metaethylphenol in purified form from the crystals by fractional distillation.

4. The process of separating metaethylphenol from a mixture consisting mainly of metaethylphenol and paraethylphenol, with the metaethylphenol being more than 30%, which comprises mixing such a mixture with a molecular excess of orthotoluidine, crystallizing metaethylphenol-orthotoluidine from the resulting mixture, separating the crystals so produced, and recovering metaethylphenol in purified form from the crystals by fractional distillation.

5. The process of separating metaethylphenol from a mixture consisting mainly of metaethylphenol and paraethylphenol with the metaethylphenol content being more than 30%, which comprises mixing such a mixture with orthotoluidine and an inert diluent, producing in the resulting mixture a sufficiently low temperature to form crystals of metaethylphenol-orthotoluidine, separating such crystals, and recovering metaethylphenol in purified form from the crystals.

6. The process of separating metaethylphenol from a mixture consisting mainly of metaethylphenol and paraethylphenol, with the metaethylphenol being more than 30%, which comprises mixing such a mixture with a molecular excess of orthotoluidine and an inert diluent, crystallizing metaethlyphenol-orthotoluidine from the resulting mixture, separating the crystals so produced, and recovering metaethylphenol in purified form from the crystals.

7. The process of separating metaethylphenol from a mixture consisting mainly of metaethylphenol and paraethylphenol with the metaethylphenol content being more than 30%, which comprises mixing such a mixture with orthotoluidine and a petroleum naphtha, producing in the resulting mixture a sufficiently low temperature to form crystals of metaethylphenol-orthotoluidine, separating such crystals, and recovering metaethylphenol in purified form from the crystals.

8. The process of separating metaethylphenol from a mixture consisting mainly of metaethylphenol and paraethylphenol, with the metaethylphenol being more than 30%, which comprises mixing such a mixture with a molecular excess or orthotoluidine and a petroleum naphtha, crystallizing metaethylphenol-orthotoluidine from the resulting mixture, separating the crystals so produced, and recovering metaethylphenol in purified form from the crystals.

9. The process of separating metaethylphenol from a mixture consisting mainly of metaethylphenol and paraethylphenol with the metaethylphenol content being more than 40%, which comprises mixing such a mixture with orthotoluidine, and producing in the resulting mixture a sufficiently low temperature to form crystals of metaethylphenol-orthotoluidine, separating such crystals, and recovering metaethylphenol in purified form from the crystals.

10. The process of separating metaethylphenol from a mixture consisting mainly of metaethylphenol and paraethylphenol, with the metaethylphenol being more than 40%, which comprises mixing such a mixture with a molecular excess of orthotoluidine, crystallizing metaethylphenol-orthotoluidine from the resulting mixture, separating the crystals so produced, and recovering metaethylphenol in purified form from the crystals.

11. The process of producing metaethylphenol-orthotoluidine, which comprises mixing the orthotoluidine and a mixture consisting mainly of metaethylphenol and paraethylphenol, with the metaethylphenol content being more than 30%, crystallizing metaethylphenol - orthotoluidine from the resulting mixture and separating the crystals so produced.

12. The new compound metaethylphenol-orthotoluidine.

FRANCIS E. CISLAK.
MERRITT M. OTTO.

REFERENCES CITED

The following references are of record in the file of this patent:

UNITED STATES PATENTS

| Number | Name | Date |
|---|---|---|
| 1,502,849 | Ehrlich | July 29, 1924 |
| 1,830,859 | Schotte et al. | Nov. 10, 1931 |
| 1,980,384 | Comte | Nov. 13, 1934 |
| 1,980,901 | Bently et al. | Nov. 13, 1934 |
| 2,029,642 | Semon | Feb. 4, 1936 |
| 2,432,063 | Cislak et al. | Dec. 2, 1947 |
| 2,456,581 | Cislak et al. | Dec. 14, 1948 |
| 2,456,582 | Cislak et al. | Dec. 14, 1948 |

OTHER REFERENCES

Pfeiffer, "Organische Molekulverbindungen," Stuttgart (1927), page 332.